United States Patent [19]

Iura et al.

[11] Patent Number: 5,549,946
[45] Date of Patent: Aug. 27, 1996

[54] VARNISH-COATED HEAT-RESISTANT ROLL FOR COPYING MACHINE, AND METHOD OF PRODUCING THE SAME

[75] Inventors: Kazuo Iura; Yasuhiko Onishi; Takashi Itoh, all of Yokkaichi, Japan

[73] Assignee: Sumitomo Wiring Systems, Ltd., Mie, Japan

[21] Appl. No.: 465,907

[22] Filed: Jun. 6, 1995

Related U.S. Application Data

[63] Continuation of Ser. No. 45,798, Apr. 15, 1993, abandoned.

[30] Foreign Application Priority Data

Apr. 16, 1992 [JP] Japan ................................ 4-124341

[51] Int. Cl.$^6$ ............................ B32B 1/00; B05D 3/00
[52] U.S. Cl. .................... 428/35.8; 428/36.9; 428/457; 428/458; 428/473.5; 428/474.4; 492/53; 427/384; 427/388.1; 427/388.2; 427/358; 427/559
[58] Field of Search ........................... 428/458, 473.5, 428/35.8, 36.9, 474.4; 492/56, 53, 457; 29/527.4; 427/544, 559, 384, 388.1, 388.2, 358

[56] References Cited

U.S. PATENT DOCUMENTS

| | | | |
|---|---|---|---|
| 4,078,286 | 3/1978 | Takiguichi et al. | 29/132 |
| 4,150,181 | 4/1979 | Smith | 427/444 |
| 4,154,919 | 5/1979 | Sheratte | 528/186 |
| 4,371,445 | 2/1983 | Faigle | 252/12 |
| 4,411,977 | 10/1983 | Tarumi et al. | 430/126 |
| 4,505,573 | 3/1985 | Brewington et al. | 355/3 DD |
| 4,818,593 | 4/1989 | Engel | 428/220 |
| 4,927,909 | 5/1990 | Wadhwa et al. | 528/331 |
| 4,945,156 | 7/1990 | Jenekhe et al. | 528/485 |
| 5,001,217 | 3/1991 | Tsai et al. | 528/337 |
| 5,089,304 | 2/1992 | Kuder | 427/388.1 |

FOREIGN PATENT DOCUMENTS

| | | |
|---|---|---|
| 2-137872 | 5/1990 | Japan . |
| 3-110137 | 5/1991 | Japan . |
| 4-361026 | 12/1992 | Japan . |
| 4-357022 | 12/1992 | Japan . |

OTHER PUBLICATIONS

Powers, E. J., et al., "History and Development of Polybenzimidole," pp. 1–23, Symposium on the History of High Performance Polymers, American Chemical Society, New York, Apr. 15–18, 1986.

Herward Vogel and C. S. Marvel, "Polbenzimidazoles, New Thermally Stable Polymers" Journal of Polymer Science, vol. L, pp. 511–539, 1961.

*Primary Examiner*—Patrick Ryan
*Assistant Examiner*—Marie R. Yamnitzky
*Attorney, Agent, or Firm*—Oliff & Berridge

[57] ABSTRACT

A heat-resistant roll for copying machine use which comprises a metallic roll having a surface which has been coated with a varnish containing polybenzimidazole as a major resin component, followed by curing, wherein the coating is conducted by means of rotational coating with application of pressure.

18 Claims, No Drawings

VARNISH-COATED HEAT-RESISTANT ROLL FOR COPYING MACHINE, AND METHOD OF PRODUCING THE SAME

This is a Continuation of application Ser. No. 08/045,798 filed Apr. 15, 1993, (now abandoned).

FIELD OF THE INVENTION

The present invention relates to a varnish-coated heat-resistant roll for use in a copying machine, obtained by coating a metallic roll with a varnish containing polybenzimidazole.

BACKGROUND OF THE INVENTION

In the field of copying machines of the thermal transfer type, color copiers for fixing color toners tend to increase in number. Although fixing temperatures around 300° C. are required of the fixing rolls for attaining good fixation of toners, there has not been such a highly heat-resistant fixing roll for 300° C. use, and the use temperature for the conventional Teflon-coated fixing rolls is around 200° C. at the most.

Thus, a fixing roll which thermally fixes toners to a receiving sheet plays a very important role in copying machines because it fuses the toners and this governs the clearness and quality of the copy. On the other hand, besides the trend toward the production of color copiers, there are general trends in thermal fixing type copying machines toward size reduction and performance elevation (increase in printing speed). Under these circumstances, fixing rolls have come to be more frequently required to have better heat and abrasion resistance. Since Teflon coating film-covering rolls have insufficient abrasion resistance, the attainable minimum thickness for the coatings is about 20 µm at the most. Such large coating thicknesses, however, result in a significantly impaired efficiency of heat conduction during toner fusion that has been conducted with the aid of heat, so that the number of copies that can be turned out per minute is reduced.

As a result, there are limitations in the development of large-sized copying machines of the high speed revolution type. On the other hand, in the case of small-sized copying machines so-called "stand-alone", the conventional Teflon-coated rolls should be replaced with fresh ones at intervals of 200,000 copies because of the rapid wear of the roll coatings. Accordingly, it is necessary to station persons for roll replacement at offices of copying machine users, which is very costly and can be a factor that increases the relative cost of the copying machines. For these reasons, the coating layer of a thermal fixing roll is required to have good abrasion resistance as well as heat resistance.

By the way, polybenzimidazole was developed by the late Prof. Maryell and co-workers in Arizona State University, U.S.A. and disclosed in H. Vogel and C. S. Marvel, *J. Polym. Sci.*, Vol. 50, p511 (1961). However, their synthesis of polybenzimidazole failed to yield solvent-soluble polymer because of crosslinking reaction and hence, it is thought that use of their polybenzimidazole as, for example, a varnish for heat-resistant rolls is difficult.

Hoechst Celanese Corp. of America has succeeded in inhibiting the crosslinking reaction to yield a polymer which is available under trade name "Celazole". Reference can be made to E. J. Powers and G. A. Serad, "History and Development of Polybenzimidazoles" presented at the Symposium on the History of High Performance Polymers, American Chemical Society, New York, April 15–18, 1986 and published in *High Performance Polymers*. This polymer is superior in heat resistance to polyimides and currently has the best heat-resisting properties. Specifically, the polymer has a heat distortion temperature of 435° C. and an oxygen index of 58%, is incombustible in the air, retains its physical properties over a wide temperature range of from a temperature as high as 760° C. to a temperature as low as −200° C., and has a dielectric breakdown voltage of 20.9 KV/mm, which data show that the polymer is incombustible in the air. However, there have so far been no reports on the ability of the polymer to form a film by the solvent-cast method, or on an actual examination of properties of a film formed by applying the polymer on a roll. This is attributable to the poor film-forming ability of polybenzimidazole.

Illustratively stated, since the glass transition temperature ($T_g$) of polybenzimidazole is 427° C., it is necessary for film formation that baking should be performed at a temperature of 410° C. or higher. Although crosslinking proceeds only when the baking temperature is not lower than that, the crosslinking reaction competes with oxidative decomposition at such a high temperature and the control of the reaction is therefore difficult. In other words, it is extremely difficult to enhance film strength by baking only and it is expected that PBI film formation is considerably difficult.

SUMMARY OF THE INVENTION

An object of the present invention is to enable easy formation of a film having excellent heat and abrasion resistance by coating a metallic roll with a varnish containing polybenzimidazole.

The present invention provides a heat-resistant roll for copying machine use, which comprises a copying machine-use metallic roll having a surface which has been coated with a varnish containing polybenzimidazole as a major resin component, said coating being conducted by means of rotational coating with application of pressure.

In producing the heat-resistant roll for copying machine use, it is effective to conduct the coating with application of a pressure in the range of from 0.01 to 100 kg/cm², and it is preferred to incorporate a radical polymerization initiator into the varnish described above.

DETAILED DESCRIPTION OF THE INVENTION

A varnish which can be used in the present invention comprises a resin component containing polybenzimidazole as a major resin component and a solvent.

The polybenzimidazole (hereafter referred to as "PBI") is a polymer having, as a repeating unit, a divalent group derived from benzimidazole, preferably represented by formula (I)

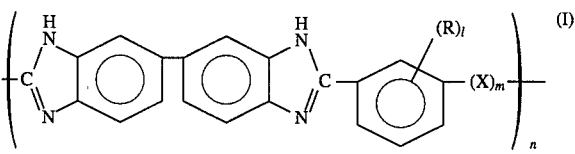

wherein X represents a sulfur atom or an oxygen atom; R represents an alkyl group, an alkoxy group, or an ester group; l is 0 or an integer of 1 to 4; m is 0 or 1; and n is an integer of 5 or more, preferably from 50 to 1,000 and more preferably from 200 to 600. Particularly preferred are those of formula (I) wherein l and m are 0. PBI used in the present invention is preferably a linear polymer having a low or intermediate polymerization degree. PBI can be prepared by the method described in the aforesaid "History and Development of Polybenzimidazoles", and it is also available under trade name "Celazole" which is a dimethylacetamide solution of PBI.

The resin component of the varnish may contain other resins, if desired, such as polyester, polyester-nylon, polyesterimide, polyamideimide and polyimide, as well as Teflon described later as a releasing agent. PBI is contained in an amount of at least 5% by weight, preferably 30% by weight or more, particularly preferably 55% by weight or more, based on the total weight of the resin component.

Examples of the solvent used in the varnish of the present invention include basic solvents such as dimethylacetamide (DMA), dimethylformamide (DMF), and pyridine; and hydrogen bond-cleaving solvents such as dimethylsulfoxide (DMSO). The varnish concentration, i.e., the resin concentration of the varnish, may be properly selected from the wide range of from 1 to 80% by weight per volume (hereafter referred to as %(W/V)) and particularly preferably 5 to 70%(W/V).

According to the present invention, it is important to coat the varnish on a metallic roll in such a manner that PBI in the varnish is neatly stacked on the roll. This can be done by means of rotational coating with application of pressure, preferably ranging from 0.01 to 100 kg/cm$^2$, more preferably 0.2 to 5 kg/cm$^2$. The rotation speed is preferably from from 10 to 1,000 rpm.

This coating technique utilizes non-Newtonian flow characteristic of the PBI-containing varnish. In this coating process, the varnish comes to have enhanced flowability due to the viscoelasticity under pressure and is more apt to wet the substrate, thus showing significantly improved application properties. If the coating pressure and the rotational speed of the metallic roll are thus regulated properly, the coating of the metallic roll with PBI can be satisfactorily carried out even without addition of a radical polymerization initiator described later in the varnish.

It is preferred to incorporate a radical polymerization initiator into the varnish so as to form coatings having high abrasion resistance.

The radical polymerization initiator which can be used in the present invention is preferably a compound capable of initiating polymerization at a relatively low temperature, e.g., 70° C. or lower, such as benzoyl peroxide, lauroyl peroxide, di-t-butyroperoxyphthalate, azobisisobutyro nitril, phenylazoallylsulfonic acid and N-nitroso-N-acyl compounds. The amount of radical polymerization initiator is generally from 0.005% to 5% by weight, preferably from 0.01 to 0.5% by weight, based on the volume of the varnish.

While PBI is commercially available in the form of a DMA solution ("Celazole"), mere coating of the commercially available PBI solution cannot provide a PBI film having high film strength. For example, when films of PBI were formed by diluting a 30%(W/V) DMA solution of PBI with DMA to about 5%(W/V), applying the diluted solution on a glass and an aluminum plate, drying the coatings with a heating lamp for 3 hours, further drying the coatings at 130° C. for 4 hours, and then baking the dry coatings in an electric furnace at 350° C. for 80 minutes, the thus-obtained films had insufficient strength. Upon further baking at 450° C. for 60 minutes, the films decomposed. Analysis of the baked PBI films with a reflection-type FT-IR revealed that the absorption peak at a wavenumber of about 1,100 cm$^{-1}$ was weak which peak is assigned to C—N—C resulting from the crosslinking reaction of PBI, showing that although a film was formed, its strength was insufficient due to insufficient crosslinking. It has been found that the unsuccessful PBI film formation is due to the influence of a polymerization inhibitor incorporated in the dimethylacetamide (DMA) used as a solvent for PBI. In the case, the addition of radical polymerization initiator is effective to form a PBI having high film strength. It is believed that film formation for PBI is based on intermolecular crosslinking reaction at imidazole moieties upon heating or irradiation of electron beams, and the radical polymerization initiator such as azobisisobutyronitrile (AIBN) conquers the adverse effect of the polymerization inhibitor. Specifically, a 30% DMA solution of PBI in which AIBN had been added was used to examine the film-forming properties thereof in detail.

Illustratively stated, a 30%(W/V) DMA solution of PBI was diluted with DMA to give a solution having a PBI content of about 5%(W/V) and, at the same time, AIBN was added to the solution in an amount of 0.1%(W/V). The resulting solution was applied on a glass and the coatings were baked at 350° C. for 80 minutes. As a result, a film having sufficient strength was formed. This film was then baked at 450° C. for 60 minutes, but it did not decompose. The baked PBI film formed on the glass was analyzed with a reflection-type FT-IR. As a result, the absorption peak at a wavenumber of about 1,100 cm$^{-1}$ which is assigned to C—N—C resulting from the crosslinking reaction of PBI was observed clearly. The reasons for the formation of such a film with sufficient strength may be that the AIBN enabled the crosslinking reaction to proceed sufficiently under those conditions. If a radical polymerization initiator such as AIBN functions only to eliminate the effect of the inhibitor in the DMA, elevating the baking temperature to a desired degree may be sufficient, that is, baking at around 450° C. may be adequate because the glass transition temperature ($T_g$) is 427° C. From the above, it can be thought that the radical polymerization initiator does not function only to eliminate the effect of the inhibitor but also to accelerate the crosslinking reaction.

The varnish used in this invention may be applied on a metallic roll and baked or exposed to electron beams to produce a varnish-coated roll. This baking or irradiation treatment is generally conducted by repeating the procedure comprising coating with varnish, and baking or irradiating. The term "baking" is to heat the coated varnish to cure and it may also be effected by way of IR irradiation.

The metallic roll may be made of any of a variety of metals including aluminum, steel, stainless steel, copper, brass, nickel, and chromium, and it is coated with the PBI-containing varnish in a gel state and solution state with application of a predetermined pressure, while the metallic roll is kept being rotated at a rate of from several revolutions per minute to several thousands of revolutions per minute. The diameter of the metallic roll is not particularly limited and is generally from 5 to 500 mm.

The number of coating times is determined according to the required film thickness, and can be suitably selected from the range of from once to several thousands of times. The preferred range of the number of coating times necessary for attaining a desired final film thickness is from a few times to 30 times. The furnace to be used in this coating operation may be a generally employed horizontal or vertical one, but the two types of furnaces may be suitably used according to use purposes. As in ordinary baking finish, it is possible to change the number of coating times, the baking temperature, the coating speed, and other conditions according to the kind of the coating material to be baked and the type of the baking furnace.

The baking temperature may be selected from the range of from room temperature to 1,000° C. It should, however, be noted that baking temperature slightly affects the toner release properties of the fixing roll, and that higher temperatures are preferred in the case of PBI alone but too high temperatures cause the fear of carbonization. Therefore, the baking temperature is preferably from 500° C. to 800° C.

When determining the baking time, the baking temperature is taken into account. Although the baking time may be selected from the range of from several seconds to several tens of hours, it is preferably short for high baking temperatures and is long for low baking temperatures.

For the purpose of improving toner release properties, an adequate release agent may be added to the PBI-containing varnish. For example, it is preferable to add those available under trade name "Teflon" (e.g., polytetrafluoroethylene), boron nitride, or the like in an amount of from 1 to 1900% by weight, more preferably 50 to 200% by weight, particularly preferably 50% to 80% by weight, based on the weight of PBI.

The thickness of the baked varnish coatings is not limited, but it is generally from 1 to 100 μm, preferably from 3 to 20 μm in view of efficiency of heat conduction during toner fusion.

The present invention will be explained below in more detail with reference to the following Examples, but the invention is not construed as being limited thereto. In these Examples, PBI coatings were formed on metallic rolls using suitable combinations of the above-described conditions, the evaluation results for the coatings being given later. In the Examples, all parts are by weight.

EXAMPLE 1

A varnish consisting of 30 parts of PBI, 70 parts of DMA and AIBN in an amount of 0.1% by weight based on the sum (volume) of the PBI and DMA was applied uniformly at a thickness of 7 μm on the surface of a cylindrical stainless-steel roll having an outer diameter of 30 mm and a length of 280 mm, at a coating pressure of 0.5 kg/cm$^2$ while the roll was kept being rotated at 300 rpm on its cylinder axis. The coating was then baked at 600° C. for 5 minutes, thereby obtaining a highly heat-resistant PBI-coated roll for copying machine use.

EXAMPLE 2

A varnish consisting of 30 parts of PBI, 60 parts of DMA, 10 parts of DMSO, and AIBN in an amount of 0.1%(W/V) based on the sum of the PBI, DMA, and DMSO was applied uniformly at a thickness of 8 μm on the surface of a cylindrical stainless-steel roll having an outer diameter of 30 mm and a length of 280 mm, at a coating pressure of 0.5 kg/cm$^2$ while the roll was kept being rotated at 300 rpm on its cylinder axis. The coating was then baked at 600° C. for 5 minutes, thereby obtaining a highly heat-resistant PBI-coated roll for copying machine use.

EXAMPLE 3

A varnish consisting of 20 parts of PBI and 80 parts of DMA was applied uniformly at a thickness of 9 μm on the surface of a cylindrical stainless-steel roll having an outer diameter of 30 mm and a length of 280 mm, at a coating pressure of 0.5 kg/cm$^2$ while the roll was kept being rotated at 300 rpm on its cylinder axis. The coating was then baked at 700° C. for 5 minutes, thereby obtaining a highly heat-resistant PBI-coated roll for copying machine use.

EXAMPLE 4

A varnish consisting of 18 parts of PBI, 8 parts of polytetrafluoroethylene (PTFE), 74 parts of DMA and AIBN in an amount of 0.1%(W/V) based on the sum of the PBI, PTFE, and DMA was applied uniformly at a thickness of 9 μm on the surface of a cylindrical stainless-steel roll having an outer diameter of 30 mm and a length of 280 mm, at a coating pressure of 0.3 kg/cm$^2$ while the roll was kept being rotated at 500 rpm on its cylinder axis. The coating was then baked at 700° C. for 5 minutes, thereby obtaining a highly heat-resistant PBI-coated roll for copying machine use.

EXAMPLE 5

A varnish consisting of 17 parts of PBI, 17 parts of PTFE, and 66 parts of DMA was applied uniformly at a thickness of 9 μm on the surface of a cylindrical stainless-steel roll having an outer diameter of 30 mm and a length of 280 mm, at a coating pressure of 0.4 kg/cm$^2$ while the roll was kept being rotated at 500 rpm on its cylinder axis. The coating was then baked at 600° C. for 5 minutes, thereby obtaining a highly heat-resistant PBI-coated roll for copying machine use.

EXAMPLE 6

A varnish consisting of 14 parts of PBI, 32 parts of PTFE, and 54 parts of DMA was applied uniformly at a thickness of 12 μm on the surface of a cylindrical stainless-steel roll having an outer diameter of 30 mm and a length of 280 mm, at a coating pressure of 0.4 kg/cm$^2$ while the roll was kept being rotated at 300 rpm on its cylinder axis. The coating was then baked at 600° C. for 5 minutes, thereby obtaining a highly heat-resistant PBI-coated roll for copying machine use.

EXAMPLE 7

A varnish consisting of 20 parts of PBI, 80 parts of DMA and AIBN in an amount of 0.1%(W/V) based on the sum of the PBI and DMA was applied uniformly at a thickness of 4 μm on the surface of a cylindrical stainless-steel roll having an outer diameter of 30 mm and a length of 280 mm, at a coating pressure of 0.5 kg/cm$^2$ while the roll was kept being rotated at 1,000 rpm on its cylinder axis. The coating was then baked at 600° C. for 5 minutes. The above procedure was conducted twice, thereby obtaining a highly heat-resistant PBI-coated roll for copying machine use.

EXAMPLE 8

A varnish consisting of 5 parts of PBI, 95 parts of DMA, and AIBN in an amount of 0.1%(W/V) based on the sum of the PBI and DMA was applied uniformly at a thickness of 2 μm on the surface of a cylindrical stainless-steel roll having an outer diameter of 30 mm and a length of 280 mm, at a coating pressure of 0.5 kg/cm$^2$ while the roll was kept being rotated at 1,000 rpm on its cylinder axis. The coating was then baked at 600° C. for 5 minutes. The above procedure was conducted 7 times, thereby obtaining a highly heat-resistant PBI-coated roll for copying machine use.

Properties of the samples obtained in Examples 1 to 8 were evaluated and are summarized in Tables 1 and 2.

TABLE 1

|  | Example 1 | Example 2 | Example 3 | Example 4 |
| --- | --- | --- | --- | --- |
| Finished roll outer diameter (mm) | 30.014 | 30.016 | 30.018 | 30.018 |
| Coating film thickness (mm) | 0.007 | 0.008 | 0.009 | 0.009 |
| Softening temperature (°C.) | 450 | 450 | 460 | 400 |
| Wear (times)* | 45 | 48 | 50 | 35 |

* load 4N (JASO D611)

TABLE 2

|  | Example 5 | Example 6 | Example 7 | Example 8 |
| --- | --- | --- | --- | --- |
| Finished roll outer diameter (mm) | 30.018 | 30.024 | 30.016 | 30.028 |
| Coating film thickness (mm) | 0.009 | 0.012 | 0.008 | 0.014 |
| Softening temperature (°C.) | 350 | 330 | 450 | 450 |
| Wear (times)* | 35 | 30 | 50 | 52 |

* load 4N (JASO D611)

As apparent from Tables 1 and 2, the rolls which were obtained under the respective conditions as described above have extraordinary heat resistance as high as use temperatures of 350° C. or higher and also have excellent abrasion resistance.

As demonstrated above, highly heat-resistance rolls for copying machine use can be provided according to the present invention.

While the invention has been described in detail and with reference to specific embodiments thereof, it will be apparent to one skilled in the art that various changes and modifications can be made therein without departing from the spirit and scope thereof.

What is claimed is:

1. A heat-resistant roll for copying machine use which comprises a metallic roll having a surface coating comprising polybenzimidazole, wherein said surface coating is provided by coating said metallic roll with a varnish containing at least 5% by weight of polybenzimidazole as a resin component based on total weight of resin component in the varnish, followed by curing said surface coating by baking at a temperature between about 450° C. and 1000° C., wherein said coating is conducted by means of rotational coating with application of pressure and wherein said polybenzimidazole in the cured surface coating is cross-linked.

2. The roll as in claim 1, wherein all of the repeating units of said polybenzimidazole are represented by formula (I)

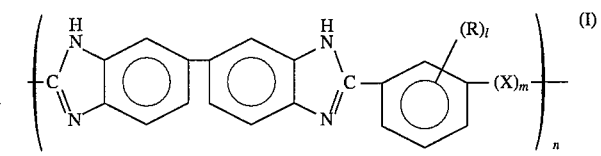

wherein X represents a sulfur atom or an oxygen atom; R represents an alkyl group, an alkoxy group, or an ester group; l is 0 or an integer of 1 to 4; m is 0 or 1; and n is an integer of 5 or more.

3. The roll as in claim 2, wherein said polybenzimidazole has a repeating unit of formula (I), wherein l and m are 0.

4. The roll as in claim 3, wherein said polybenzimidazole is a linear polymer.

5. The roll as in claim 1, wherein said varnish further contains a radical polymerization initiator in an amount of 0.005% to 5% by weight based on the volume of the varnish.

6. The roll as in claim 5, wherein said radical polymerization initiator is selected from the group consisting of benzoyl peroxide, lauroyl peroxide, di-t-butyroperoxyphthalate, azobisisobutyronitrile, phenylazoallylsulfonic acid and N-nitroso-N-acyl compounds.

7. The roll as in claim 1, wherein said varnish contains a release agent in an amount of 1 to 1900% by weight based on the weight of polybenzimidazole.

8. A method of producing a heat-resistant roll for copying machine use, which comprises applying a coated layer comprising polybenzimidazole by coating a surface of a metallic roll with a varnish containing at least 5% by weight of polybenzimidazole as a resin component based on total weight of resin component in the varnish and curing the coated layer by baking said coated layer at a temperature between about 450° C. and 1000° C., wherein said coating is conducted by means of rotational coating with application of a pressure in a range of from 0.01 kg/cm² to 100 kg/cm² and wherein said polybenzimidazole in the cured coated layer is cross-linked.

9. The method as in claim 8, wherein the rotation speed is within the range of from 10 to 1,000 rpm.

10. The method as in claim 8, wherein all of the repeating units of said polybenzimidazole are represented by formula (I)

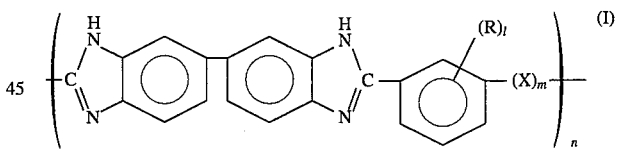

wherein X represents a sulfur atom or an oxygen atom; R represents an alkyl group, an alkoxy group, or an ester group; l is 0 or an integer of 1 to 4; m is 0 or 1; and n is an integer of 5 or more.

11. The method as in claim 10, wherein said polybenzimidazole has a repeating unit of formula (I), wherein l and m are 0.

12. The method as in claim 11, wherein said polybenzimidazole is a linear polymer.

13. The method as in claim 8, wherein said varnish further contains a radical polymerization initiator in an amount of 0.005% to 5% by weight based on the volume of the varnish.

14. The method as in claim 13, wherein said radical polymerization initiator is selected from the group consisting of benzoyl peroxide, lauroyl peroxide, di-t-butyroperoxyphthalate, azobisisobutyronitrile, phenylazoallylsulfonic acid and N-nitroso-N-acyl compounds.

15. A method of producing a heat-resistant roll as claimed in claim 8, wherein said application of pressure is in a range from 0.2 kg/cm² to 5 kg/cm².

16. A heat-resistant roll for copying machine use which comprises a metallic roll having a surface coating comprising polybenzimidazole, wherein said surface coating is provided by coating said metallic roll with a varnish containing from 5% to 80% by weight of polybenzimidazole as a resin component based on total volume of the varnish followed by curing said surface coating by baking at a temperature between about 450° C. and 1000° C., wherein said coating is conducted by means of rotational coating with application of pressure and wherein said polybenzimidazole in the cured surface coating is cross-linked.

17. A method of producing a heat-resistant roll for copying machine use, which comprises applying a coated layer comprising polybenzimidazole by coating a surface of a metallic roll with a varnish containing from 5% to 80% by weight of polybenzimidazole as a resin component based on total volume of the varnish and curing the coated layer by baking said coated layer at a temperature between about 450° C. and 1000° C., wherein said coating is conducted by means of rotational coating with application of a pressure in a range from 0.01 kg/cm$^2$ to 100 kg/cm$^2$ and wherein said polybenzimidazole in the cured coated layer is cross-linked.

18. A method of producing a heat-resistant roll as claimed in claim 17, wherein said application of pressure is in a range from 0.2 kg/cm$^2$ to 5 kg/cm$^2$.

* * * * *